United States Patent [19]
Huber et al.

[11] Patent Number: 5,131,017
[45] Date of Patent: Jul. 14, 1992

[54] INCREMENTAL POSITION MEASURING SYSTEM

[75] Inventors: Norbert Huber, Traunreut; Simon Graf, Burgkirchen, both of Fed. Rep. of Germany

[73] Assignee: Dr. Johannes Heidenhain GmbH, Traunreut, Fed. Rep. of Germany

[21] Appl. No.: 681,882

[22] Filed: Apr. 8, 1991

[30] Foreign Application Priority Data

Apr. 9, 1990 [DE] Fed. Rep. of Germany ....... 4011411

[51] Int. Cl.$^5$ .............................................. G06M 3/06
[52] U.S. Cl. .............................................. 377/24; 377/3; 377/32
[58] Field of Search ................................. 377/3, 24, 32

[56] References Cited

U.S. PATENT DOCUMENTS

| 4,064,501 | 12/1977 | Yost et al. | 377/32 |
| 4,085,311 | 4/1978 | Ohsako et al. | 377/32 |
| 4,229,647 | 10/1980 | Burkhardt | 377/32 |
| 4,897,647 | 1/1990 | Sakamoto et al. | 340/870.19 |

FOREIGN PATENT DOCUMENTS

| 2747208A1 | 2/1979 | Fed. Rep. of Germany . | |
| 2911560 | 9/1979 | Fed. Rep. of Germany | 377/32 |
| 3604160A1 | 9/1987 | Fed. Rep. of Germany . | |
| 0154316 | 7/1986 | Japan | 377/32 |
| 63-187106A | 8/1988 | Japan . | |
| 651386 | 9/1985 | Switzerland . | |

Primary Examiner—Stanley D. Miller
Assistant Examiner—Scott A. Ouellette
Attorney, Agent, or Firm—Willian Brinks Olds Hofer Gilson & Lione

[57] ABSTRACT

An evaluation device with an absolute value counter is provided in an incremental position measuring system, which determines the absolute position even in case of loss of the main power supply. The evaluation device is operated by means of an emergency power supply while the main power supply is out. Following the restoration of the main power supply, counting pulses are supplied to a follow-up counter (11) by a pulse emitter, until the follow-up counter has reached the counter reading of the absolute value counter. Two rectangular signals, which are phase-shifted by 90° in relation to each other, are formed as a function of the counting signals, which are present at the evaluation device in the form of output signals.

14 Claims, 1 Drawing Sheet

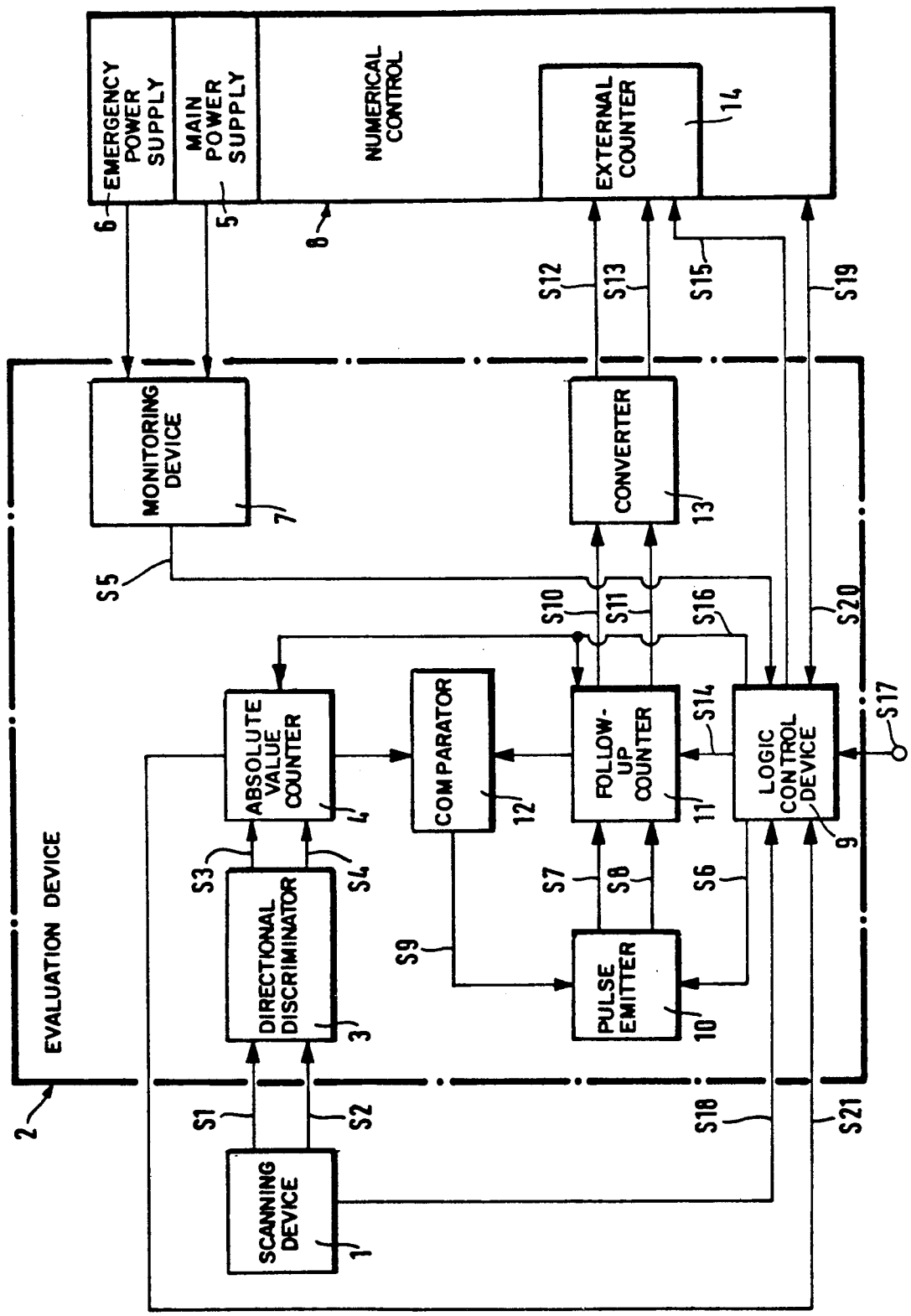

fig
INCREMENTAL POSITION MEASURING SYSTEM

FIELD OF THE INVENTION

The invention relates to an incremental position measuring system for measuring the relative position of two objects, where the graduation of a graduated scale is scanned by a scanning device for generating periodic scanning signals which are phase-shifted in respect to each other and where the scanning signals are supplied to an evaluation device for the formation of counting signals.

BACKGROUND OF THE INVENTION

Position measuring systems of this type are utilized in particular in connection with numerical controls for measuring the relative position of a tool in relation to a workpiece to be processed, as well as in coordinate measuring machines.

In incremental length and angle measuring systems, a grid-like, incremental measuring graduation is scanned with a scanning device and periodic analog signals are generated. Rectangular signals are formed from the periodic analog signals and are supplied to a forward-/backward counter. The counter reading indicates the relative position of the objects to be measured. When the electrical supply fails, the counter reading and thus the knowledge of the relative position at that time is lost. In accordance with the state of the art it is necessary after a power loss to approach a bench mark, the absolute position of which is known. When passing this bench mark, the forward/backward counter is set to a pre-selected value and measuring must be started again.

SUMMARY OF THE INVENTION

It is the object of the invention to design an incremental position measuring system in such a way that it operates free of disruption and saves electricity, and that it can quickly output the absolute relative position of the objects to be measured following the loss of the main power supply.

This object is attained in accordance with the invention in that the evaluation device and the scanning device are connected with a main power supply and an emergency, or backup, power supply, that a monitoring device is provided, which checks the voltage of the main power supply and, when the voltage falls below a pre-determined value, switches the evaluation device from normal operation to emergency operation, where the scanning signals are supplied to a directional discriminator for the formation of counting signals both during normal operation and emergency operation and where the counting signals are counted in relation to their direction in an absolute value counter, that components which are only active in normal operation are assigned to the absolute value counter which, as a function of the counter reading of the absolute value counter, form rectangular signals which are phase-shifted in relation to each other and supply them to the output of the evaluation device, that these components are inactive during emergency operation and that no phase-shifted rectangular signals are present at the output of the evaluation device.

The advantages realized with the invention consist in particular in that the relative position is again exactly present following a loss of the main power supply and the count can be forwarded with simple means to an external unit. The interface of the external unit can therefore be simply designed. Advantageous embodiments of the invention are set forth in the dependent claims.

BRIEF DESCRIPTION OF THE DRAWINGS

The single drawing FIGURE is a block diagram illustrating an exemplary embodiment of the invention.

DETAILED DESCRIPTION OF THE PRESENTLY PREFERRED EMBODIMENT

The single drawing FIGURE shows the block diagram of a scanning device 1, known per se, for scanning the graduation of a graduated scale. The scanning device 1 supplies two analog scanning signals S1, S2, which are phase-shifted by 90° in relation to each other, to an evaluation device 2. Counting signals S3, S4 are formed from the two phase-shifted, analog scanning signals S1, S2 as a function of the direction of movement between the two objects to be measured.

The evaluation device 2 furthermore contains an absolute value counter 4, which is continuously supplied with the counting signals S3, S4. This absolute value counter 4, the directional discriminator 3 and the scanning device 1 are continuously supplied with electrical power or current. The power (or current) supply can be operated particularly economically by being clocked, for example. It is assured by means of the continuous power/current supply that the counter reading of the absolute value counter 4 always corresponds to the actual relative position and can be output, when needed. The power (or current) supply consists of a main power supply 5 and an emergency, or backup, power supply 6. Both power supplies 5 and 6 are connected with a monitoring device 7. This monitoring device 7 continuously checks the voltage level of the main power supply 5. As soon as the voltage level falls below a pre-selected value, a switch from the main power supply 5 to the emergency power supply 6 is made. For example, the main power supply 5 is integrated into a numerical control 8 and the emergency power supply may be a battery or a storage capacitor. In the example illustrated, the emergency power supply 6 is also contained in the numerical control 8.

The further structure of the incremental position measuring system will now be described by means of the different modes of operation:

A. Normal Operation:

Normal operation means that the main power supply 5 is operating and has a voltage level above the pre-selected value. The monitoring device 7 recognizes normal operation and supplies an indication signal S5 to a logic control device 9. By means of the control signal S6, the logic control device 9 activates a pulse emitter 10, which supplies directionally-dependent counting signals S7, S8 to a follow-up counter 11 as a function of the counter reading of the absolute value counter 4. The counter readings of the absolute value counter 4 and the follow-up counter 11 are continuously compared with each other by means of a comparator 12. By means of the control signal S9, the comparator 12 causes the pulse emitter 10 to supply counter signals S7, S8 in the form of forward- or backward-counting pulses to the follow-up counter until both counter readings are identical.

A converter 13 is placed downstream of the follow-up counter 11, which, as a function of the supplied counting signals S7, S8, converts the output signals S10, S11 of the follow-up counter into two rectangular signals S12, S13, which are phase-shifted by 90° in relation to each other. These rectangular signals S12, S13 appear at the output of the evaluation device 2 and, in the example illustrated, are supplied to the numerical control 8 and are counted in accordance with their direction in an external counter 14. The converter 13 can also be placed downstream of the pulse emitter 10 and can form rectangular signals S12, S13, which are phase-shifted by 90° in relation to each other, from the counting signals S7, S8.

It can be seen that during normal operation all components of the incremental position measuring system must be supplied with power/current.

If the counter reading of the absolute value counter 4 becomes zero, a zero signal S21 is forwarded by the absolute value counter 4 to the logic control device 9 and, with a simultaneous appearance of a reference signal S18, a zero pulse S15 is forwarded by the evaluation device 2 to the counter 14, which as a consequence thereof is set to a pre-selected value.

B. Emergency Operation:

Emergency operation means that the level of voltage of the main power supply 5 has fallen below a pre-determined value. In this state at least the scanning device 1, the directional discriminator 3, the absolute value counter 4, the monitoring device 7 and the logic control device 9 are supplied with power/current. The monitoring device 7 provides an indicator signal S5 to the logic control device 9, which puts the pulse emitter 10 out of service by means of the control signal S6. It is also possible to supply the indicator signal S5 directly to the pulse emitter 10 to put it out of service.

No rectangular signals S12, S13 are present at the output of the evaluation device 2 during emergency operation.

C. Restoration of the Main Power Supply:

As soon as the monitoring device 7 recognizes that the voltage of the main power supply 5 has again reached or exceeded the pre-determined voltage level, a switch from emergency operation to normal operation is made. The following steps are performed in the course of this:

the monitoring device 7 supplies an indicator signal S5 to the logic control device 9;

the logic control device 9 supplies a reset signal S14 to the follow-up counter 11, which puts it at zero;

a synthetically generated zero pulse S15 is issued by the evaluation device 2 to the counter 14 of the numerical control 8, because of which this counter 14 is set to a given value;

the pulse emitter 10 is actuated and therefore the follow-up counter 11 is started;

rectangular signals S12, S13, phase-shifted by 90° in relation to each other, are issued by the evaluation device 2 to the counter 14, until the comparator 12 has determined that the absolute value counter 4 and the follow-up counter 11 have the same readings.

It is particularly simple to set an absolute zero position at any arbitrary point by means of this incremental position measuring system. If, for example, a length measure with a plurality of bench marks is used as graduated scale, it is possible to assign the absolute zero position to an arbitrarily selected bench mark. For this purpose the absolute value counter 4 and the follow-up counter 11 are set to zero by means of the reset signal S16 when this selected bench mark is read off. The selection of the bench mark can be made in such a way, that a reference signal S17 is present at the logic control device 9, which is logically AND-linked with the bench mark signal S18. The reference signal S17 is preferably generated by scanning a reference edge. Thus the reset signal S16 is issued only if the reference signal S17 and the bench mark signal S18 are simultaneously present at the logic control device 9.

When setting or determining the absolute zero position, the counter 14 of the numerical control 8 is set to a given value which preferably is also zero. However, the value can also deviate from zero if the absolute zero position of the numerical control 8 does not agree with the absolute zero position of the position measuring system.

The same method can be used when scanning a graduated disk with a bench mark. In this case, after a set number of revolutions the bench mark is fixed as the absolute zero position when the reference signal S17 appears.

The absolute value counter 4 preferably consists of two counters. When using a revolution transmitter as the position measuring system, one counter is provided for detecting the revolutions and one counter for detecting the position within one revolution. In length measuring systems it is possible to detect the number of bench mark with the first counter and with the second counter the position between the bench marks.

It has already be extensively described that the type of operation (normal or emergency) is reported by the monitoring device 7 by means of the indicator signal S5 to the logic control device 9. If the monitoring device 7 detects normal operation, a ready signal S19 is sent to the numerical control 8 from the logic control device 9 and thus from the evaluation device 2. The numerical control 8 or the counter 14 also reports to the evaluation device 2 by means of the ready signal S20 if it is ready to receive the phase-shifted rectangular signals S12, S13. It is particularly advantageous if a switch to normal operation is only made if the ready signals S19 and S20 are present. Both ready signals S19 and S20 can be present in one signal line. In this way this signal line then is operated bi-directionally, for example by means of an open collector circuit.

What is claimed is:

1. In an incremental position measuring system for measuring the relative position of two objects, of the type comprising a graduated scale with graduations, a scanning device, and an evaluation device, wherein the scanning device scans the graduations of the graduated scale and generates periodic scanning signals, and wherein the signals are phase-shifted with respect to each other and are supplied to the evaluation device for the formation of counting signals, the improvement comprising:

a main power supply coupled to supply electrical power to the position measuring system;

an emergency power supply coupled to supply backup electrical power to the position measuring system;

a monitoring device operative to monitor operation of the main power supply and to signal the evaluation device to switch from a normal mode of operation to an emergency mode of operation when electrical power supplied by the main power supply satisfies a selected criterion;

a directional discriminator included in the evaluation device and coupled to the scanning device to receive the scanning signals and to generate counting signals in response thereto, said counting signals indicative of a counting direction;

an absolute value counter included in the evaluation device and responsive to the counting signals to count the counting signals in the counting direction indicated by the counting signals to form a counter reading;

an output signal generating circuit included in the evaluation device and responsive to the absolute value counter and operative to supply a plurality of rectangular signals to an output of the evaluation device, wherein the rectangular signals are supplied as a function of the counter reading and are phase-shifted in relation to each other;

first means, responsive to the monitoring device, for disabling the output signal generating circuit without disabling the directional discriminator and the absolute value counter during the emergency mode of operation, and for enabling the directional discriminator, the absolute value counter, and the output generating circuit during the normal mode of operation such that the rectangular signals are not supplied during the emergency mode of operation.

2. The apparatus as claimed in claim 1 further comprising an external device coupled to the evaluation device to receive the rectangular signals and operative to provide a ready signal to the evaluation device;

wherein the first means comprises means for inhibiting a transition from the emergency mode of operation to the normal mode of operation until the ready signal is provided to the evaluation device.

3. The apparatus as claimed in claim 1 wherein the output signal generating circuit further comprises:

a pulse emitter operative to supply additional counting signals;

a follow-up counter coupled to the pulse emitter and responsive to the counting signals supplied by the pulse emitter to maintain a follow-up counter reading;

a comparator coupled to the absolute value counter and the follow-up counter and operative to compare the counter reading of the absolute value counter with the counter reading of the follow-up counter;

a converter placed downstream of at least one of the follow-up counter and the pulse emitter and operative to generate said plurality of rectangular signals in response to at least one of the follow-up counter and the pulse emitter.

4. The apparatus as claimed in claim 3 wherein the monitoring device comprises means for signaling the evaluation device to switch from the emergency mode of operation to the normal mode of operation when a voltage supplied by the main power supply rises to a value which at least equals a pre-determined level; and wherein the comparator comprises means, operative after the monitoring device signals a transition from the emergency mode of operation to the normal mode of operation, for comparing the counter reading of the follow-up counter with the counter reading of the absolute value counter and causing the pulse emitter to emit counting signals until the counter readings are equal.

5. The apparatus as claimed in claim 3 wherein the first means comprises a logic control device coupled to the monitoring device, and wherein the monitoring device signals the evaluation device to switch between the normal and emergency modes of operation with an indicator signal applied to the logic control device, said indicator signal indicative of whether the normal mode of operation or the emergency mode of operation has been signalled.

6. The apparatus as claimed in claim 5 wherein the logic control device comprises means, operative in response to a switch from the emergency mode of operation to the normal mode of operation, for supplying a reset signal to the follow-up counter and a control signal to enable the pulse emitter.

7. The apparatus as claimed in claim 5 wherein the logic control device further comprises means, operative in response to a switch to the emergency mode of operation, for disabling the pulse emitter.

8. The apparatus as claimed in claim 3 wherein the first means comprises a logic control device coupled to the monitoring device; and wherein the logic control device comprises means for receiving a reference signal and a bench mark signal, and means for supplying a reset signal for resetting both the follow-up counter and the absolute value counter in response to simultaneous occurrence of the reference signal and the bench mark signal.

9. The apparatus as claimed in claim 8 wherein the logic control device further comprises means for generating a zero pulse when the reference signal and the bench mark signal occur simultaneously.

10. The apparatus as claimed in claim 9 further comprising an external counter, wherein the zero pulse is supplied to the external counter to set the external counter to a predetermined value.

11. The apparatus as claimed in claim 1 wherein the scanning device comprises means for generating a reference signal and wherein the evaluation device comprises:

means for supplying a zero pulse for setting an external counter when both (1) the reference signal from the scanning device is present; and (2) the absolute value counter has a counter reading of zero.

12. The apparatus as claimed in claim 10 wherein the external counter is included in a numerical control, and wherein the evaluation device comprises means for supplying a ready signal to the numerical control indicative of whether the evaluation device is in the emergency or normal mode of operation.

13. The apparatus as claimed in claim 3 further comprising:

an external device coupled to the evaluation device and operative to provide a ready signal to the evaluation device and to accept the rectangular signals;

second means, included in the comparator, for causing the pulse emitter to generate said additional counting signals until the counter reading of the follow-up counter equals the counter reading of the absolute value counter; and means, included in the first means and operative when (1) the monitoring device signals a switch from the emergency to the normal mode of operation and (2) the external device provides the ready signal, for performing the following functions:

a) resetting the follow-up counter;
b) issuing a zero pulse to the external device; and
c) enabling the pulse emitter, the follow-up counter and the second means.

14. The apparatus as claimed in claim 1 wherein the evaluation device and the scanning device are operated in a clocked manner during the emergency mode of operation.

* * * * *

UNITED STATES PATENT AND TRADEMARK OFFICE
CERTIFICATE OF CORRECTION

PATENT NO. : 5,131,017
DATED : July 14, 1992
INVENTOR(S) : Norbert Huber et al.

It is certified that error appears in the above-indentified patent and that said Letters Patent is hereby corrected as shown below:

On the title page, line 8 of the Abstract, delete "(11)".

Signed and Sealed this

Twenty-first Day of June, 1994

Attest:

BRUCE LEHMAN

*Attesting Officer*      *Commissioner of Patents and Trademarks*